United States Patent Office 3,484,673
Patented Dec. 16, 1969

3,484,673
PULSE GENERATOR WITH ENERGY CONSERVING CIRCUIT
Donald Henry Strobel, Cedarburg, Wis., assignor to Badger Meter Manufacturing Company, Milwaukee, Wis., a corporation of Wisconsin
Filed Dec. 27, 1966, Ser. No. 604,737
Int. Cl. H03k 3/64
U.S. Cl. 320—1                    11 Claims

ABSTRACT OF THE DISCLOSURE

This disclosure relates to apparatus for generating unidirectional pulses of current in a load. A pair of capacitors are alternately charged and discharged through the load, and energy is conserved by employing the load current to partially charge the capacitor discharged at the time of the previous pulse.

---

This invention relates to apparatus for generating repetitive pulses of electrical energy, and more particularly to such a generator for use with apparatus utilizing the nuclear magnetic resonance phenomenon.

One system utilizing such apparatus is disclosed in copending application Ser. No. 570,066, now Patent No. 3,419,795, filed Aug. 3, 1966. In that application a flowmeter is disclosed which employs nuclear magnetic resonance to determine the quantity of fluid (having atoms with finite gyromagnetic moments) flowing through a tube. The apparatus requires that a pulse of electrical energy be applied to a coil located at a magnetization station, for tagging a bolus of the fluid present within the coil at the magnetization station at the time such pulse is applied by giving it a detectable magnetic moment.

It is desirable that the applied pulse be high in amplitude and short in time, so that the bolus within the magnetization coil will be distinctly tagged without requiring an excessive amount of power from the triggering source.

As described in the aforementioned application, a pulse is generated in the magnetization coil by discharging a capacitor through it, and suppressing oscillation of the circuit including the capacitor and the coil. It is desirable, however, to utilize the energy which is wasted in suppressing oscillation of the magnetization circuit.

It is, accordingly, a principal object of the present invention to provide a pulse magnetizer which conserves the energy applied to the magnetization coil.

Another object of the present invention is to provide a pulse magnetizer capable of providing a high-energy, short duration pulse of electrical energy to a magnetization coil, in combination with a low capacity power supply having a relatively constant load.

A further object of the present invention is to provide such a pulse magnetizer responsive to control pulses to apply pulses of electrical energy to the magnetization coil.

Figure 1:
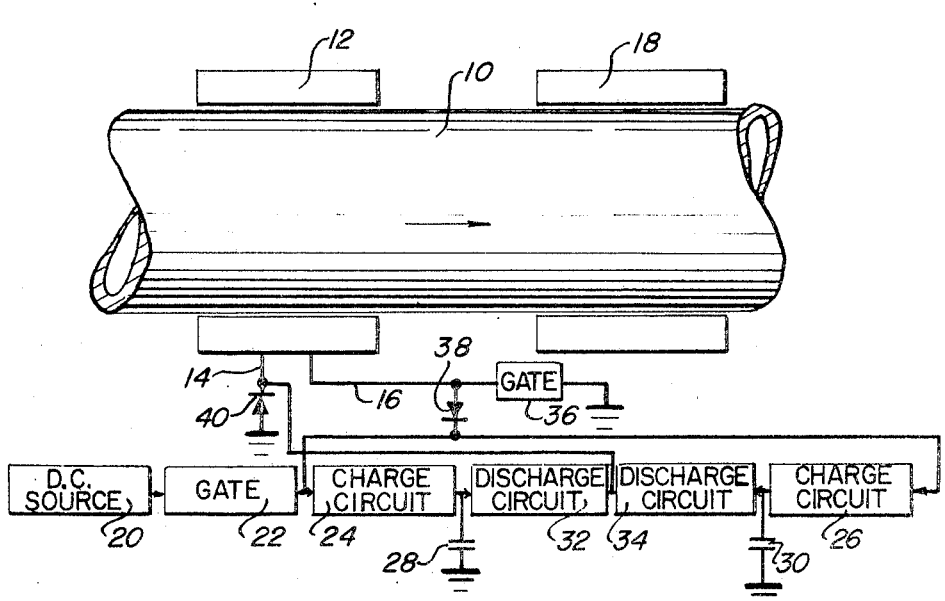
Figure 3:
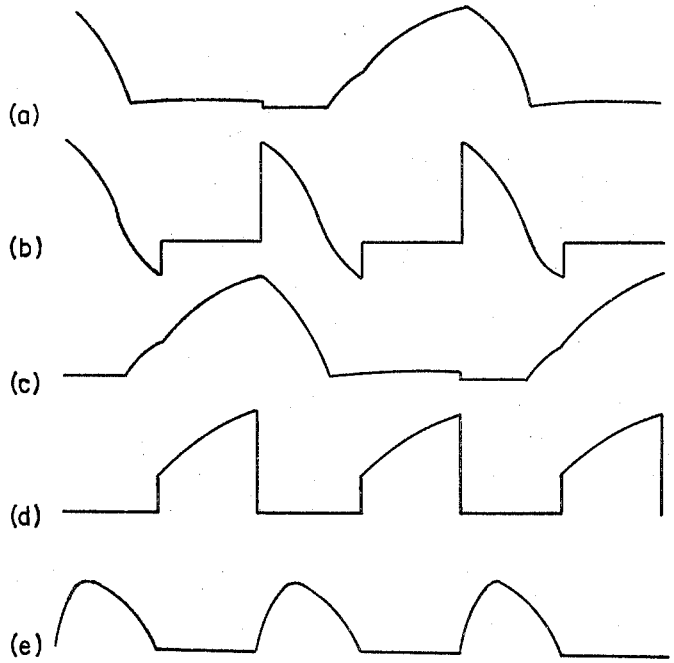
Figure 2:
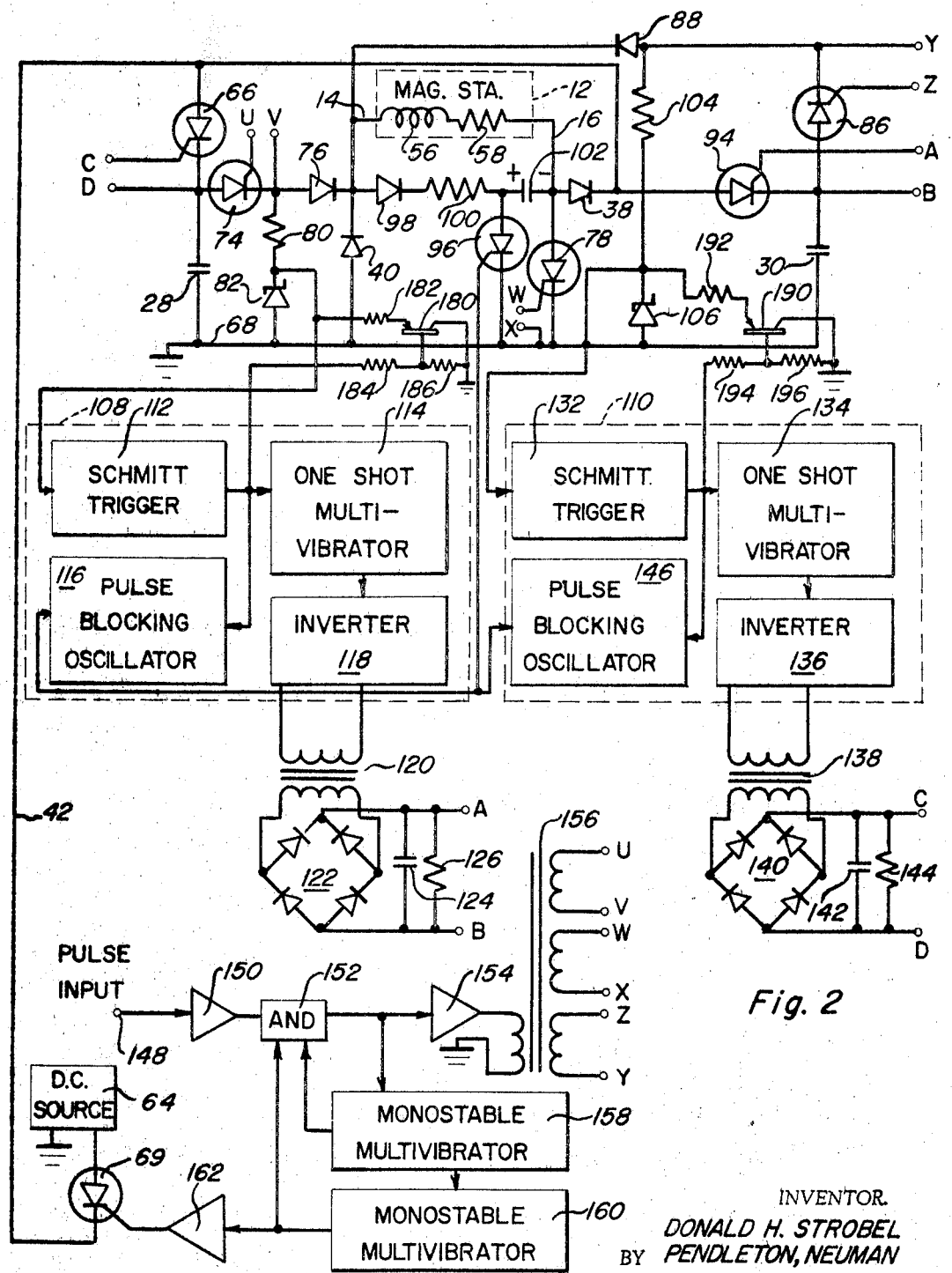

These and other objects of the present invention will become manifest from an examination of the following description, and the accompanying drawings, in which:

FIG. 1 is a functional block diagram of an illustrative embodiment of a pulse magnetizer constructed in accordance with the present invention; and FIG. 2 is a schematic diagram of the pulse magnetizer illustrated in FIG. 1; and FIG. 3 is a series of waveforms which occurs at various points within the circuit of FIG. 2 during operation of the magnetizer.

In one embodiment of the present invention, there is provided a pulse magnetizer having a DC source, a pair of capacitors, means for each connected across said source and in parallel with each other, gate means for alternately charging said capacitors from said source, gate means for alternately discharging said capacitors across said magnetizing coil, and unilaterally conducting means for partially charging each capacitor from the energy discharged from the other capacitor.

Referring now to FIG. 1, there is illustrated, in functional form, one embodiment of a pulse magnetizer embodying the present invention. The magnetizer is intended for association with a flowmeter associated with a pipe 10. Fluid is flowing through the pipe in the direction of the arrow. At a magnetizing station 12, the fluid within the pipe 10 is tagged by changing one of its magnetic properties, and specifically by giving it a magnetization in a given direction. The tag is applied by apparatus, such as a coil 12, at the magnetizing station. The coil 12 is energized by an electrical signal applied to the leads 14 and 16. At a detecting station 18, located downstream from the magnetizing station 12, other apparatus (not shown) detects the arrival of a tagged bolus of fluid. Knowing the time between the application of the tag at the magnetization station 12 and its arrival at the detection station 18, and knowing the distance between these stations, and the average cross-sectional area of the pipe, one may compute the volume of fluid flowing through the pipe 10 per unit time.

The circuitry connected to the lines 14 and 16 is adapted to supply a pulse to the lines 14 and 16 in accordance with a predetermined logic. Power to the unit is provided by a DC source 20 which is connected through a gate 22 to two separate charging circuits 24 and 26. The charging circuit 24 operates to charge a first capacitor 28 from the DC source, and the charging circuit 26 charges a second capacitor 30. The two capacitors 28 and 30 are connected by discharge circuits 32 and 34, respectively, to the lead 14, which in turn is connected to the coil 12.

The capacitors 28 and 30 are charged positively, with respect to ground, so that discharge of either capacitor produces current from the capacitor, through the coil 12 and thence to ground through a normally open gate 36. As either capacitor is discharged through the coil 12, the voltage drop across the coil decreases, and eventually falls through zero when the capacitor is fully discharged. The current through the coil 12 continues, however, due to the inductance of the coil.

At the moment the voltage across the coil becomes zero, the discharge circuit is closed and the gate 36 is opened, thereby diverting the current from the coil 12 through a diode 38 to the charging circuits 24 and 26. The charging circuit associated with the capacitor which has not just been discharged is energized, and thus the current resulting from the collapse of the magnetic field around the coil 12 is employed to charge that capacitor. A diode 40, connected from ground to the lead 14, completes the circuit for charging that capacitor from the coil 12.

The discharge circuits 32 and 34 are triggered alternately from a source of actuating pulses, so that the capacitors 28 and 30 are discharged alternately. While one capacitor is discharging, the other one is being charged, so that rapid pulsing of the coil 12 can be achieved. The DC source 20 makes up the power lost during each cycle, so that the capacitors 28 and 30 are charged to the same voltage level during each cycle.

It is evident that in the operation of the embodiment of FIG. 1, the only possible current flow through the coil 12 is in one direction, so that the direction of the pulse magnetic field produced during each pulse applied to the coil 12 at the magnetization station is the same. Only a single half cycle of an AC waveform may be applied to the coil at the magnetization station 12, the frequency of the waveform depending upon the inductance of the coil 12 and the capacitance of the capacitors 28 and 30. By choosing appropriate values for the capacitors, in relation to the value of the inductance of the coil 12 at the magnetization station, a magnetizing pulse of any desired magnitude and duration may be produced.

Referring now to FIG. 2, the magnetization coil 12 is illustrated in schematic form within a dashed rectangle 12, and is represented symbolically by an inductance 56 and a resistance 58.

The charging and discharging circuits of the capacitors 28 and 30 are similar to each other, and so only that associated with one of them need be specifically described. The sequence of charging and discharging each of the capacitors 28 and 30 is similar to that of FIG. 1. The source of voltage for operation of the circuit is a DC source 64 in which the negative terminal is grounded and the positive terminal is connected through a gating SCR 69 to a power line 42.

The power line 42 is connected through an SCR 66 to one terminal of the capacitor 28. The other terminal of the capacitor 28 is connected to a ground reference line 68. The SCR 69 serves to charge the capacitor 28 from the power line 42, provided that the SCR is gated on, when the control terminals CD are activated.

An SCR 74 has its anode connected to the positive terminal of the capacitor 28 and its cathode connected through a diode 76 and through the coil 12, and an SCR 78, to form the path by which the capacitor 28 may be discharged through the coil 12. The SCR 74 is triggered by applying an appropriate signal to the terminals UV, and the SCR 78 is triggered by a signal applied to the terminals WX. When this occurs there is a voltage drop across the series circuit including the diode 76, the coil 12, and the SCR 78. A circuit comprising a resistor 80 and a Zener diode 82 is connected in parallel with the series circuit just described. The operation of the zener diode 82 is to maintain a substantially constant voltage across its terminals whenever the voltage applied to the circuit including the resistor 80 and the zener diode 82 is more than that value. As a result, whenever the capacitor 28 is being discharged through the coil 12 (via the SCR 74), there is a voltage drop across the Zener diode 82 of substantially constant value.

In the circuit associated with the capacitor 30, an SCR 86 is provided which forms the discharge path for the capacitor 30 through a diode 88 and through the coil 12. The SCR 86 and the diode 88 are equivalent with the SCR 74 and the diode 76.

An SCR 94 is connected between the positive terminal of the capacitor 30 and the power line 42, and is equivalent with the SCR 66. The SCR 86 may be energized by applying an appropriate signal to the terminals YZ and the SCR 94 may be activated by applying an appropriate signal to the terminals AB.

The SCR 78 is a part of the discharge circuit for both capacitors 28 and 30. That is, when the capacitor 30 is being discharged through the SCR 86 and the coil 12, the SCR 78 is also rendered conductive. The SCR 86 may be turned on by application of an appropriate signal to the terminals WX. When either capacitor 28 or 30 is being discharged, however, the circuit through the SCR 78 is maintained in conductive condition only until the voltage across the coil 12 drops to zero. At that instant, an SCR 96 is triggered into condition in a manner which will be desicribed hereinafter, and the effect of triggering the SCR 96 is to turn off the SCR 78.

A series circuit including a diode 98, a resistor 100 and a capacitor 102 is connected across the coil 12. The diode 98 serves to limit current through the circuit in one direction and the resistor 100 and capacitor 102 form a circuit for charging the capacitor 102 to a value similar to the peak voltage drop across the coil 12. As one of the capacitors 28 or 30 is being discharged through the coil 12, the voltage drop therethrough falls, and the SCR 78 is turned off when this voltage becomes zero. The diode 98 prevents the capacitor 102 from discharging, however, so that when the SCR 78 is to be deactivated, there is still a charge on the capacitor 102 in the polarity indicated in FIG. 2. The SCR 96 is activated at this instant, and the capacitor 102 is thereby connected across the SCR 78, via the SCR 96. As the polarity of the capacitor 102 opposes the required polarity for conduction through the SCR 78, the SCR 78 is quickly brought into its nonconductive state. As the current flow through the resistor 100 soon diminishes to the point where it is not enough to maintain the SCR 96 in its conductive state, it also is extinguished, as soon as the charge on the capacitor 102 is dissipated.

Returning to the example in which the capacitor 28 is fully charged at the beginning and, is discharged through the coil 12, the capacitor 28 is discharged through the coil 12 and the SCR 78 until the voltage across the coil falls to zero. At thta time, the SCR 78 is turned off by the means which has been described above, and the SCR 94, which had been turned on previously, now conducts the current formerly flowing through the SCR 78 from the coil 12, and this current is employed to partially charge the capacitor 30.

A diode 40 is connected from the lead 16 of the coil 12 to ground, and clamps the most negative voltage which may occur across the series circuit of the capacitor 28 and the SCR 74. Thus, as the voltage across the coil 12 becomes negative, the current through the coil is drawn from ground through the reference line 68 and the diode 40, and the current through the SCR 74 falls below the cut off value. The SCR 74 is thus turned off.

A diode 38 is connected in series with the coil 54 and is poled so as to permit current to flow only in one direction from the coil 12 to charge the capacitors 28 and 30 during the portion of the cycle in which the voltage across the manget coil 12 has changed its sign.

A circuit including a series resistor 104 and a Zener diode 106 is connected between the reference line 68 and the junction of the diode 88 and the SCR 86, and is equivalent with the circuit including the resistor 80 and the SCR 82.

The junction between the resistor 80 and the Zener diode 82 is connected to the input of a zero voltage sensor 108. Similarly, the junction of the resistor 104 and Zener diode 106 is connected to the input of a similar voltage sensor 110.

The function of the zero voltage sensors 108 and 110 is to determine when the voltage across the coil 12 has passed through zero. When this occurs the SCR 96 is to be activated, and an output of each of the voltage sensors 108 and 110 is connected to the control terminal of the SCR 96, whereby the SCR 96 is triggered to turn off the SCR 78.

Both zero voltage sensors 108 and 110 include a Schmitt trigger to which the input is connected and which is adapted to generate a square wave of a duration equal to the time for which the voltage on the input is above a predetermined value. This value is slightly less than the Zener voltage of the Zener diodes 82 and 106, so that the operation of the Schmitt trigger 112 in the zero voltage sensor 108, for example, is to produce a square wave for the duration equal to the duration for which the Zener diode 82 has the voltage drop exceeding the predetermined value. The beginning of the pulse produced by the Schmitt trigger 112 of the zero voltage sensor 108 occurs when the SCR 74 is first fired, to discharge the capacitor 60 through the coil 54, and the pulse ends when the voltage across the series circuit including the resistor 80 and the Zener diode 82 is zero.

The initial part of the pulse produced by the Schmitt trigger (or the leading edge) operates a one-shot multivibrator 114 which is connected to the output of the Schmitt trigger 112, and which is adapted to produce at its output a pulse of a relatively long duration, beginning coincidentally with the pulse produced by the Schmitt trigger 112. The trailing edge of the pulse produced by the Schmitt trigger 112 operates a pulse blocking oscillator 116, and the output of the pulse blocking oscillator 116 is connected to the control terminal of the SCR 96. Accordingly, when the voltage across the coil 12 passes through zero, the pulse blocking oscillator 116 produces a pulse sufficient to turn on the SCR 96 and thereby turn off the SCR 78 as hereinbefore described.

The output of the one-shot multivibrator 114 is connected to an inverter 118. The output of the inverter 118 comprises an alternating signal having an envelope corresponding to the rectangular pulse produced by the one-shot multivibrator 114. The alternating signal is passed through the transformer 120, provided for isolation purposes, rectified in a full wave bridge type rectifier 122 and filtered by a parallel network including a capacitor 124 and a bleeder resistor 126. The resultant rectified voltage, isolated from any other circuit in the system, appears at the terminals AB. These are the terminals which have been described above as connected to the control terminals of the SCR 94. Thus, the terminals AB energize the SCR 94 for the whole period during which the SCR 74 is discharging the capacitor 28 through the coil 54, so long as the voltage drop across the coil 12 is positive.

During this interval, the SCR 78 is conducting to effectively short circuit the current flow path through the SCR 94 which would otherwise charge the capacitor 30. When the SCR 78 has been turned off, however, by triggering the SCR 96, current is free to flow through the SCR 94 and to charge up the capacitor 30.

The zero voltage sensor 110 operates in the same manner as has been described for the zero voltage sensor 108. A Schmitt trigger 132 is connected to the junction of the resistor 104 and the Zener diode 106 to generate a pulse for the period in which the voltage across the Zener diode 106 is equal to the Zener potential. The output of the Schmitt trigger 132 is connected to a one-shot multivibrator 134 which stretches the pulse produced by the Schmitt triggre 132. The output of the one-shot multivibrator 134 is connected through an inverter 136 to an isolating transformer 138. The secondary of the transformer 138 is connected to a full wave rectifier 140. The rectified DC occurring at the output of the rectifier 140 is filtered by a circuit including a parallel capacitor 142 and a bleeder resistor 144. The terminals CD, which are connected to the control terminal of the SCR 66, are connected across the resistor 144.

The Schmitt trigger is also connected to a pulse blocking oscillator 146 which is operative to produce a single spike pulse at the trailing edge of the pulse produced by the Schmitt trigger. This pulse is effective to turn on the SCR 96 and thus turn off the SCR 78, as has been described.

The system is rendered operative when a pulse input is applied to an input terminal 148. The pulse is amplified by an amplifier 150 and the output of the amplifier is connected to one of three inputs of an AND gate 152. The AND gate 152 produces an output signal when all of the three inputs are in a relatively low (or minus) condition. When that occurs the signal from the amplifier 150 is passed through the AND gate 152, amplified by an amplifier 154, and fed to the primary winding of a transformer 156. The transformer 156 has three secondary windings UV, WX, and YZ, which are connected to the control terminals of the SCR 74, 78 and 86, respectively. Accordingly, all three of the SCR's 74, 78 and 86 are turned on or energized simultaneously during each cycle.

The output of the AND gate 152 is also fed to a monostable multivibrator 158. The output of the monostable multivibrator 158 is fed in turn to the input of a second monostable multivibrator 160. The outputs of the two monostable multivibrators 158 and 160 are connected to the two remaining inputs of the AND gate 152. The outputs of the two monostable multivibrators 158 and 160 are in their higher condition or relatively more positive condition for a fixed time following energization of the monostable multivibrators. Therefore, after a pulse is passed through the AND gate 152, a time duration must pass equivalent to the total duration of the astable states of the multivibrator 158 and 160 before a subsequent pulse from the amplifier 150 may be passed by the AND gate 152. The output of the monostable multivibrator 160 is also connected by way of an amplifier 162 to the control terminal of the SCR 69. The anode of the SCR 69 is connected to the source 64, and the cathode is connected to the power line 42.

The SCR 69 operates effectively as a grate to regulate the times during which the capacitors 28 and 30 may be charged by their charging SCR 66 and 94, respectively. When the SCR 69 is in its nonconductive state, there is no complete circuit to the capacitors 28 and 30 from the DC source 64, and so no charging of the capacitors 28 and 30 may be permitted. During the time that the multivibrator 160 is emitting its monostable pulse, however, the capacitors 28 and 30 may be charged.

The period during which the capacitors 28 and 30 may be charged is therefore restricted to the time during which the monostable multivibrator 160 is being energized. This follows the application of a pulse input to the terminal 148 by the period introduced by the monostable multivibrator 158. The time delay produced by the multivibrator 158 is chosen to exceed the time required to discharge either the capacitor 28 or 30 through the coil 54. Thus, the capacitors 28 and 30 may not be charged from the DC source until after discharge of one of the capacitors (and partial charge of the other) has been completed through the coil 54. Accordingly, the time constant of the multivibrator 158 is chosen to be slightly greater than the time required to discharge the capacitors 28 and 20. Similarly, the time constant of the monostable multivibrator 160 is chosen to exceed slightly the time required to complete the charging of the capacitors 28 and 30 from the source 64. The operation of the AND gate 152 prevents any pulse which appears at the terminal 148 during the discharge period controlled by the monostable multivibrator 158 or the charging period controlled by the monostable multivibrator 160 from initiating a cycle of operation of magnetizing.

Assuming that a pulse arises at the pulse input 148 after the charging and discharging period controlled by the two monostable multivibrators 158 and 160, the pulse is effective to generate a pulse at the terminals UV, WX, and YZ, to turn on the three SCR's 74, 78 and 86. The SCR's 74 and 86 are the discharge SCR's associated with the two capacitors 28 and 30, but as only one of these two capacitors is fully charged at this time, only one of the two SCR's 74 and 86 is held on by the discharge current. The discharge current then flows through the coil 54 and the SCR 78.

Assuming again that the capacitor 28 is the one which is fully charged, the SCR 74 is activated by means of the pulse occurring at the terminals UV and operates to discharge the capacitor 28 through the diode 76, the coil 12, and the SCR 78. During this discharge, a voltage is produced acros the Zener diode 82 which activates the zero voltage sensor 108. There is thus produced the signal at the terminals AB, which activates the SCR 94 preparatory to charging the capacitor 62 with the residue of the charge on the capacitor 28. At the beginning of this charging phase of the cycle of operation, a positive pulse has been conveyed through the capacitor 128 to the SCR 90, and the capacitor 30 has been fully discharged through the SCR 90.

The voltage across the coil 12 rises and then falls to zero. When the voltage drop across the coil equals zero, the zero voltage sensor 108 produces a pulse from the pulse blocking oscillator 116 which turns on SCR 96, thereby turning off the SCR 78 by connecting the capacitor 102 across it. The remaining current flowing through the coil 12 thereupon flows through the SCR 94 to partially charge the capacitor 62. As this current is drawn through the diode 40, the SCR 74 turns off. When the current flowing rightwardly as viewed in FIG. 2 drops to zero, the SCR 94 turns off, for there is less than a sufficient amount of current to hold it in its conducting condition. At this point all of the SCR's are open and there can be no further current flow through the coil 12.

Shortly afterward, the monostable multivibrator 158 completes its period and energizes the monostable multivibrator 160. This operates to turn on the SCR 69 whereupon the reference line 68 is connected to ground. The SCR 94 may then complete the charging of the capacitor 62 from the DC source 64 since the circuit connection with the DC source 64 is completed through the SCR 69. This condition is then maintained until the application of the next pulse to the pulse input terminal 148, whereupon the same operation is repeated, with the substitution of the capacitors 28 and 30.

As the capacitors 28 and 30 are discharged very rapidly, the dielectric absorption of the capacitors causes them to build up a small residual effect charge after their discharge to zero voltage through the coil 12. In order to prevent the residual effect from spuriously triggering the Schmitt triggers 112 and 132, each trigger is provided with means to selectively change its sensitivity to the voltage across the capacitors 28 and 32.

A transistor 180 has its emitter connected via a resistor 182 to the input of the Schmitt trigger 112, its collector connected to ground, and its base connected to the output of the Schmitt trigger 112 via a voltage divider including resistors 184 and 186. When the Schmitt trigger 112 is off, i.e. before a sufficiently positive voltage has been applied to its input, its output is relatively negative, thereby biasing the transistor 180 into conduction. The emitter current of the transistor 180 flows through the resistors 80 and 182, and drops the voltage available at the input of the Schmitt trigger 112. This in effect reduces the sensitivity of the Schmitt trigger to the voltage across the capacitor 28, and prevents faulty triggering of the Schmitt trigger 112 by the residual effect charge of the capacitor 28. The full charge of the capacitor 28 is enough to actuate the Schmitt trigger, however, at the proper time when the SCR 74 is turned on.

After the Schmitt trigger 112 has been turned on, the voltage at its output rises and cuts off the transistor 180, thereby restoring the full sensitivity of the Schmitt trigger 112 in time to sense the zero voltage condition across the coil 12.

A second transistor 190 is provided for the other Schmitt trigger 132, together with resistors 192, 194 and 196 in a circuit which is the same as the one described in connection with the transistor 180. Although only a single transistor stage is described in association with the control of each of the two Schmitt triggers 112 and 132, it will be understood that a plurality of stages may be substituted for the single stages if desired.

In FIG. 3, characteristic waveforms occurring at various parts of the circuit are illustrated as time-based curves. Curves (a) and (c) illustrate the voltages across the capacitors 28 and 30, respectively. Curve (b) illustrates the voltage across the coil 12 and curve (e) illustrates the current through the coil 12. Curve (d) illustrates the charging voltage on line 42.

From the foregoing, the present invention has been described with sufficient detail as to enable others skilled in the art to make and use the same and by applying current knowledge to adapt the same for use under varying conditions of service without departing from the essential features thereof.

What is claimed is:

1. Apparatus of the type described comprising first and second capacitors, first means for charging said first capacitor, second means for discharging said first capacitor through a load in a first direction and for simultaneously partially charging said second capacitor therefrom, third means for charging said second capacitor, fourth means for discharging said second capacitor through said load in said first direction and for simultaneously partially charging said first capacitor, and means for controlling the sequence of operation of said first, second, third and fourth means.

2. Apparatus of the type described comprising first and second capacitors, first means for charging said first capacitor, second means for discharging said first capacitor through an inductive load and for simultaneously partially charging said second capacitor therefrom, third means for charging said second capacitor, fourth means for discharging said second capacitor through said inductive load and for simultaneously partially charging said first capacitor, means for controlling the sequence of operation of said first, second, third and fourth means, a source of DC potential, first switch means connected between said source and said first capacitor, second switch means connected between said source and said second capacitor, third switch means connected from said first capacitor to one terminal of said load, fourth switch means connected from said second capacitor to said one terminal of said load, and conducting means connected between the opposite terminal of said load and said first and second capacitors.

3. Apparatus according to claim 2, including control means for closing and opening said four switches in sequence, with said first, third, second, and fourth switches being closed in succession.

4. Apparatus according to claim 2, wherein all of said switch means comprise controlled rectifiers, and said conducting means comprise first and second unilateral conductors connected from said opposite terminal to said first and second capacitors.

5. Apparatus according to claim 2, including a fifth switch connected across said first capacitor and a sixth switch connected across said second capacitor for selectively discharging said first and second capacitors, respectively.

6. Apparatus according to claim 2, wherein all of said switch means comprise controlled rectifiers, and said conducting means comprises a unilateral conductor connected from said opposite terminal to said source.

7. Apparatus according to claim 6, wherein one terminal of each of said first and second capacitors are interconnected together, and including a second unilateral conductor connected from said interconnected terminals to said one terminal of said load.

8. Apparatus according to claim 6, including first and second zero voltage sensor means connected with said load and responsive to a zero voltage condition across said load to product first and second output signals, respectively, said first zero voltage sensor being operative when said third switch is closed for closing said second switch, and said second zero voltage sensor being operative when said fourth switch is closed for closing said first switch.

9. Apparatus according to claim 2, including means responsive to an input control pulse for alternately closing said third and fourth switches.

10. Apparatus according claim 9, including means for disabling said first and second switches for a predetermined time following each said input control pulse.

11. A method of producing a curent pulse through an inductive load in response to input signals, comprising the steps of charging a first capacitor, connecting said first capacitor to one terminal of said load, in response to a first input signal, to permit said first capacitor to discharge through said load, connecting a second capacitor to another terminal of said load to permit the current flowing through said load from said first capacitor to partially charge said second capacitor, supplementing the charge on said second capacitor, connecting said second capacitor to said one terminal, in response to a second input signal, to permit said second capacitor to discharge through said load in the same direction, and connecting said another terminal to said first capacitor to permit the current flowing through said load from said second capacitor to partially charge said first capacitor.

References Cited

UNITED STATES PATENTS

| | | | |
|---|---|---|---|
| 3,267,299 | 8/1966 | Bartelink | 307—108 X |
| 3,274,610 | 9/1966 | Ault et al. | 320—1 X |
| 3,034,015 | 5/1962 | Schultz | 315—244 X |
| 3,317,744 | 5/1967 | Geleunse | 328—67 X |

STANLEY M. URYNOWICZ, Jr., Primary Examiner

J. F. BREIMAYER, Assistant Examiner

U.S. Cl. X.R.

307—108, 109, 246